United States Patent
Lewis et al.

(10) Patent No.: US 9,479,433 B1
(45) Date of Patent: Oct. 25, 2016

(54) INTERCONNECTING VIRTUAL PRIVATE NETWORKS

(71) Applicant: CISCO TECHNOLOGY, INC., San Jose, CA (US)

(72) Inventors: Darrel Lewis, San Mateo, CA (US); Gregg Schudel, Coronado, CA (US); John Mullooly, Colts Neck, NJ (US); Isidoros Kouvelas, Halandri (GR); Jesper Skriver, Latsia (CY); Christian Cassar, Hampton (GB); Dino Farinacci, San Jose, CA (US); Fabio Maino, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 320 days.

(21) Appl. No.: 14/155,190

(22) Filed: Jan. 14, 2014

Related U.S. Application Data

(60) Provisional application No. 61/817,582, filed on Apr. 30, 2013.

(51) Int. Cl.
*H04L 12/715* (2013.01)
*H04L 12/24* (2006.01)
*H04L 12/911* (2013.01)
*H04L 12/723* (2013.01)

(52) U.S. Cl.
CPC .................................. *H04L 45/50* (2013.01)

(58) Field of Classification Search
CPC .......... H04L 12/4633; H04L 12/4641; H04L 45/22; H04L 45/50; H04L 12/66; H04L 2012/5621; H04L 49/354; H04L 63/0272
See application file for complete search history.

(56) References Cited

U.S. PATENT DOCUMENTS

| | | | |
|---|---|---|---|
| 8,166,205 B2 | 4/2012 | Farinacci et al. | |
| 9,019,962 B1 * | 4/2015 | Ghosh | H04L 45/586 370/392 |
| 2001/0050914 A1 * | 12/2001 | Akahane | H04L 12/4608 370/382 |
| 2007/0112975 A1 * | 5/2007 | Cassar | H04L 29/12933 709/239 |
| 2012/0176934 A1 | 7/2012 | Farinacci et al. | |

OTHER PUBLICATIONS

IETF RFC 3931, "Layer Two Tunneling Protocol—Version 3 (L2TPv3)", J. Lau, Ed., Mar. 2005.
IETF RFC 2784, "Generic Routing Encapsulation (GRE)", D. Farinacci, Mar. 2000.

* cited by examiner

*Primary Examiner* — Awet Haile
(74) *Attorney, Agent, or Firm* — Cindy Kaplan

(57) ABSTRACT

In one embodiment, a method includes receiving at a first network device in a first virtual private network, a packet destined for a second network device in communication with a second virtual private network, and transmitting the packet over the second network, wherein the packet is encapsulated for transmittal on a tunnel extending from the first network device to the second network device. The first network device is in communication with a system operable to map and encapsulate the packet and provide an overlay that traverses over the second virtual private network. An apparatus and logic are also disclosed herein.

20 Claims, 5 Drawing Sheets

INTERCONNECTING VIRTUAL PRIVATE NETWORKS

STATEMENT OF RELATED APPLICATION

The present application claims priority from U.S. Provisional Application No. 61/817,582, entitled NETWORK VIRTUALIZATION, filed on Apr. 30, 2013. The contents of this provisional application are incorporated herein by reference in its entirety.

TECHNICAL FIELD

The present disclosure relates generally to communication networks, and more particularly, to interconnecting virtual private networks.

BACKGROUND

Large Service Providers (SPs) often relay on large MPLS (Multiprotocol Label Switching) infrastructures to provide VPN (Virtual Private Network) services to customers.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
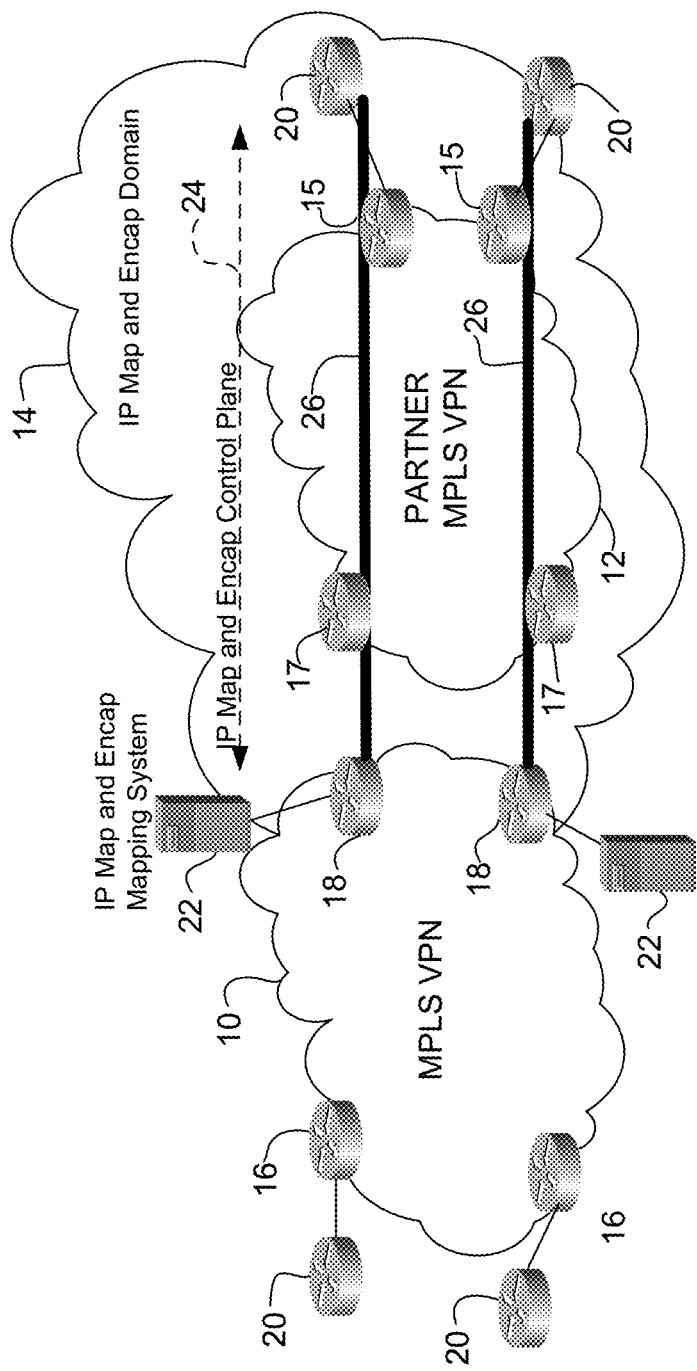
FIG. 1 illustrates an example of a network in which embodiments described herein may be implemented.

In one embodiment, a method generally comprises receiving at a first network device in a first virtual private network, a packet destined for a second network device in communication with a second virtual private network, and transmitting the packet over the second network, wherein the packet is encapsulated for transmittal on a tunnel extending from the first network device to the second network device. The first network device is in communication with a system operable to map and encapsulate the packet and provide an overlay that traverses over the second virtual private network.

In another embodiment, an apparatus generally comprises a processor for processing a packet received in a first virtual private network and destined for a second network device in communication with a second virtual private network, and transmitting the packet over the second network, wherein the packet is encapsulated for transmittal on a tunnel extending from the apparatus to the second network device. The apparatus is in communication with a system operable to map and encapsulate the packet and provide an overlay that traverses over said second virtual private network.

In yet another embodiment, a system generally comprises a processor for processing a packet received at a data plane device in communication with a first virtual private network, the packet destined for a network device in communication with a second virtual private network, mapping and encapsulating the packet for transmittal on an overlay that traverses over the second virtual private network. The system further comprises a mapping database for maintaining control plane information for use in mapping and encapsulating the packet.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

MPLS (Multiprotocol Label Switching) infrastructures are used to provide VPN (Virtual Private Network) services to customers that span across the globe. While the span of conventional SP (Service Provider) MPLS networks may be large, they are not truly global. When customer demand grows within a region where an SP does not have a Point of Presence (PoP) and where it does not make economic sense for the SP to invest directly in new network infrastructure within the region, the SP is typically forced into partnering relationships with other local or regional SPs that do have a PoP in that region. From a technical perspective, this results in a need for the primary SP (i.e., the one owning the customer relationship) and the partner SP (i.e., the one with the local or regional PoP) to interconnect their MPLS networks.

When services (e.g. QoS, IPv4/IPv6 address family, multicast, etc.) supporting networks of a primary SP and partner SP are not consistent, the potential services that can be offered to the MPLS VPN customer (end user) are limited to the lowest common denominator of the features supported between either network. This introduces limitations, for example, in terms of address family (IPv6/IPv4), multicast, QoS (Quality of Service) and SLA (Service Level Agreement) that cannot be consistently delivered end-to-end, topology controls (the partner network is seen as a 'black box' from the perspective of the primary SP (the one owning the customer account)), and operation complexity due to the need to involve the partner network in every provisioning request, which may also create security issues. In general, establishing global, end-to-end interconnectivity becomes very complicated due to both technical and business agreements between the primary SP and its numerous partner SPs that support its global VPN offering.

The embodiments described herein provide an IP Map and Encap (encapsulation) system running as an overlay that can be integrated within existing MPLS VPN infrastructure of the primary SP, to effectively extend its MPLS offering 'over the top' of any partner SP MPLS network, without any actions or interactions with partner SPs.

As described in detail below, a system, referred to herein as an 'IP Map and Encap' or 'Map and Encap' system, operates to map and encapsulate traffic received at a primary SP VPN and provide an overlay for the traffic that traverses over (i.e., 'over the top') of a partner SP VPN thereby providing virtual end-to-end global connectivity without physically extending the primary SP infrastructure. In one example, the IP Map and Encap system may operate in accordance with LISP (Locator/Identifier Separation Protocol).

Referring now to the drawings, and first to FIG. 1, an example of a network in which embodiments described herein may be implemented is shown. For simplification, only a small number of nodes are shown. In the example shown in FIG. 1, a first (primary) network 10 is in communication with a second (partner) network 12. In one embodiment, network 10 is associated with a primary SP (Service Provider) and network 12 is associated with a different SP (e.g., local or regional SP). In the example shown in FIG. 1, networks 10 and 12 are MPLS (Multiprotocol Label Switching) VPNs (Virtual Private Networks). The partner MPLS VPN 12 may be, for example, a layer 3 (L3) network. In one example, an MPLS 'Option A' interconnect (as described in IETF RFC 4364, "BGP/MPLS IP Virtual Private Networks (VPNs)", E. Rosen et al., February 2006) is used between the two VPNs 10, 12.

The networks 10, 12 are in communication over an IP Map and Encap domain 14. As described below, the primary VPN 10 may be in communication with any number of partner VPNs 12 through the IP Map and Encap domain 14.

In one embodiment, the system includes a data plane comprising network devices moving bits between MPLS and the Map and Encap system, and a control plane (indicated by line 24 in FIG. 1) comprising the devices building and maintaining a relationship between a protocol (e.g., BGP (Border Gateway Protocol)) running the MPLS VPN and a Map and Encap mapping system 22. Examples of data plane and control plane connectivity are described below with respect to FIGS. 4 and 5, respectively.

Each network 10, 12 may include any number of edge devices or intermediate (core) nodes (e.g., routers, switches, access layer devices, aggregation layer devices, or other network devices), which facilitate passage of data within the network. In the example shown in FIG. 1, each VPN 10, 12 includes a plurality of edge devices. Provider edge (PE) devices 16 located in the first network 10 are in communication with customer edge (CE) devices 20. PE devices 18 in the first network 10 are in communication with PE devices 17 in the second network 12. PE devices 15 located in the second network 12 are in communication with CE devices 20. The edge devices may be routers, switches, or other network devices configured to perform forwarding functions (e.g., L2, L3, or L2/L3 devices).

In the example shown in FIG. 1, edge devices 18 in network 10 are in communication with IP Map and Encap mapping system 22, described further below. The mapping system 22 may be implemented on a gateway, server (e.g., mapping system server) or any other type of network device. A mapping server may, for example, provide the control plane with the mapping that allows the IP Map and Encap system to encapsulate customer traffic between locations. The mapping server may maintain, for example, customer prefixes known within the IP Map and Encap control plane. The mapping system 22 may comprise any number of physical or virtual devices located in one or more networks. Also, the mapping system 22 may include one or more databases stored on one or more network devices.

In one example, the edge devices 17, 18 are configured to perform ASBR (Autonomous System Boundary Router) functions. The edge devices 18 located in the MPLS VPN 10 may also be configured to perform proxy xTR (ingress tunnel router (ITR)/egress tunnel router (ETR)) functions.

The CE devices 20 in the IP Map and Encap domain 14 may also be configured to perform xTR functions.

As shown in FIG. 1, ASBR devices 18 and CE devices 20 are located at the ends of Map and Encap tunnels 26, which allow the Map and Encap system to traverse over the partner network 12. This reduces the partner network 12 to a transport platform so that the partner network only needs to forward packets based on an outer (encap) IP header. Services provided by the primary SP VPN 10 are tunneled across (i.e., over the top of) the partner network 12, thereby eliminating the need to interface each service at the edge interconnecting the two networks. The tunnel 26 allows the primary SP VPN 10 to essentially extend to the CE 20, thus providing virtual end-to-end global connectivity without the need to physically extend the MPLS infrastructure of the primary SP.

It is to be understood that the network shown in FIG. 1 is only an example and the embodiments described herein may be implemented in networks comprising different network topologies or network devices, without departing from the scope of the embodiments. For example, MPLS VPNs are shown in the Figures and used in the examples described below, however, the embodiments may be implemented in other types of networks. Thus, it is to be understood that MPLS is provided only as an example in the embodiments described herein. Also, as described below, the primary VPN network 10 may be in communication with any number of partner networks 12.

Figure 2:
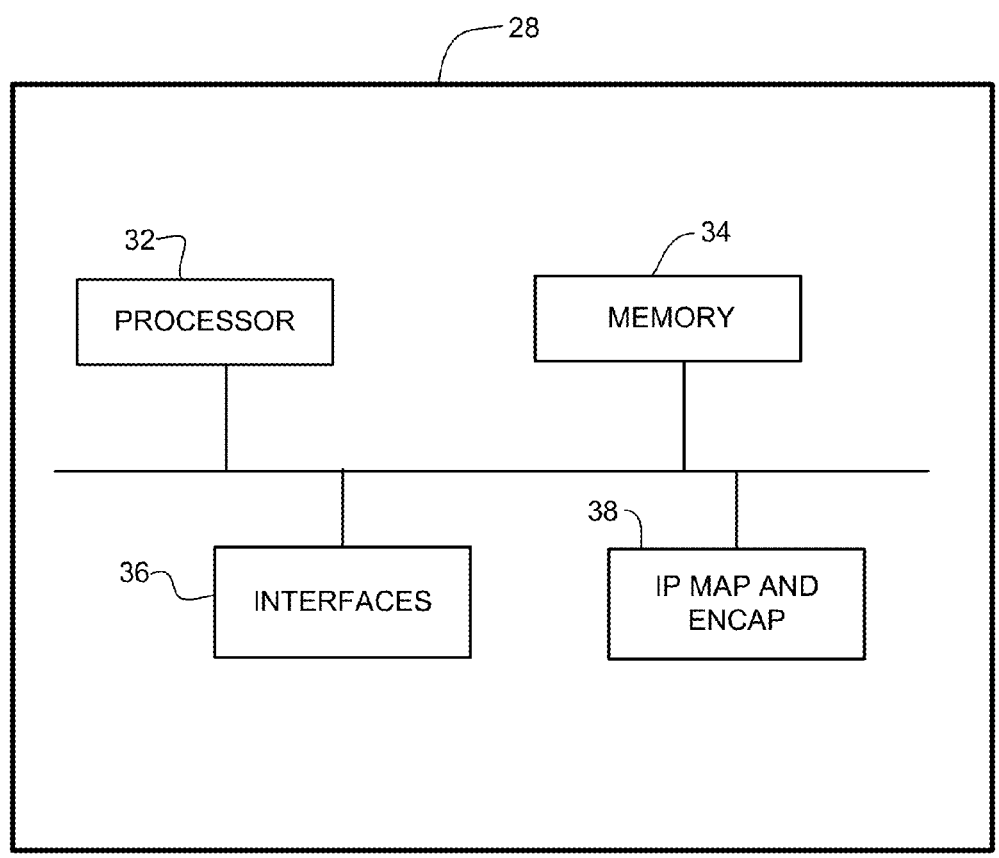
FIG. 2 depicts an example of a network device useful in implementing embodiments described herein.

FIG. 2 illustrates an example of a network device 28 that may be used to implement the embodiments described herein. In one embodiment, the network device is a programmable machine that may be implemented in hardware, software, or any combination thereof. The network device 28 includes one or more processor 32, memory 34, network interfaces 36, and IP Map and Encap components 38.

Memory 34 may be a volatile memory or non-volatile storage, which stores various applications, operating systems, modules, and data for execution and use by the processor 32. For example, IP Map and Encap components 38 (e.g., module, code, logic, database, etc.) may be stored in the memory 34. One or more IP Map and Encap components may be located at another network device (e.g., IP Map and Encap mapping system 22 in FIG. 1). The device 28 may include any number of memory components.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 28 may include any number of processors 32.

The network interfaces 36 may comprise any number of interfaces (linecards, ports) for receiving data or transmitting data to other devices. The network interface may include, for example, an Ethernet interface for connection to a computer or network.

It is to be understood that the network device 28 shown in FIG. 2 and described above is only an example and that different configurations of network devices may be used. For example, the network device 28 may further include any suitable combination of hardware, software, algorithms, processors, devices, components, or elements operable to facilitate the capabilities described herein.

Figure 3:
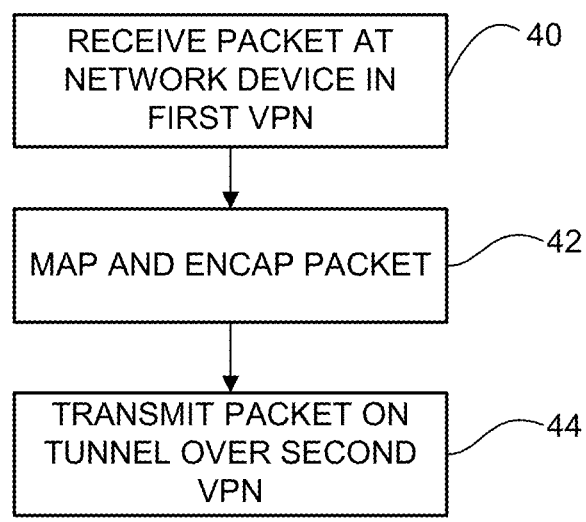
FIG. 3 is a flowchart illustrating a process for transmitting packets over interconnected virtual private networks, in accordance with one embodiment.

FIG. 3 is a flowchart illustrating an overview of a process for transmitting packets over interconnected virtual private networks, in accordance with one embodiment. At step 40, a packet is received at a first network device 18 located in a first virtual private network 10 (FIGS. 1 and 3). The packet is destined for a second network device 20 in communication with a second virtual private network 12. The packet is mapped and encapsulated by the IP Map and Encap system (step 42). As described below, the mapping and encapsulation may be performed at a gateway device, mapping system server, or other network device in communication with the first network device 18. The IP Map and Encap system provides an overlay that traverses over the second VPN 12. The packet is transmitted on tunnel 26 extending from the first network device 18 to the second network device 20 over the second VPN 12 (step 44).

It is to be understood that the process shown in FIG. 3 and described above is only an example and that steps may be added or modified without departing from the scope of the embodiments.

The following describes examples of embodiments that may be implemented in the network shown in FIG. 1. As noted above, the embodiments described herein may also be implemented in networks having different topologies, networks, configurations, or network devices.

Interconnecting VPNs with IP Map and Encap VPNs

In one or more embodiments data plane connectivity is enabled between customer sites operating within a traditional MPLS VPN and sites of the same customer that operate as an IP Map and Encap VPN (that is also traversing another MPLS network) within one or more partner MPLS networks. As described below in accordance with one embodiment, a gateway interconnectivity device performs data plane tasks. The data plane tasks may include, for example, encapsulation of traffic from an MPLS VPN to an IP Map and Encap VPN, or decapsulation of traffic from an IP Map and Encap VPN to an MPLS VPN.

In one example, a gateway device is responsible for receiving datagrams from any of the systems, and translating the appropriate datagram elements into a format that is appropriate for handling by another system. Enabling data plane interconnectivity via an IP Map and Encap architecture allows an SP not only to simplify partner interoperability relationships, but also establishes a foundation for enabling other enhancements and services that are available within an IP Map and Encap system, but not available with conventional interconnectivity mechanisms.

Figure 4:
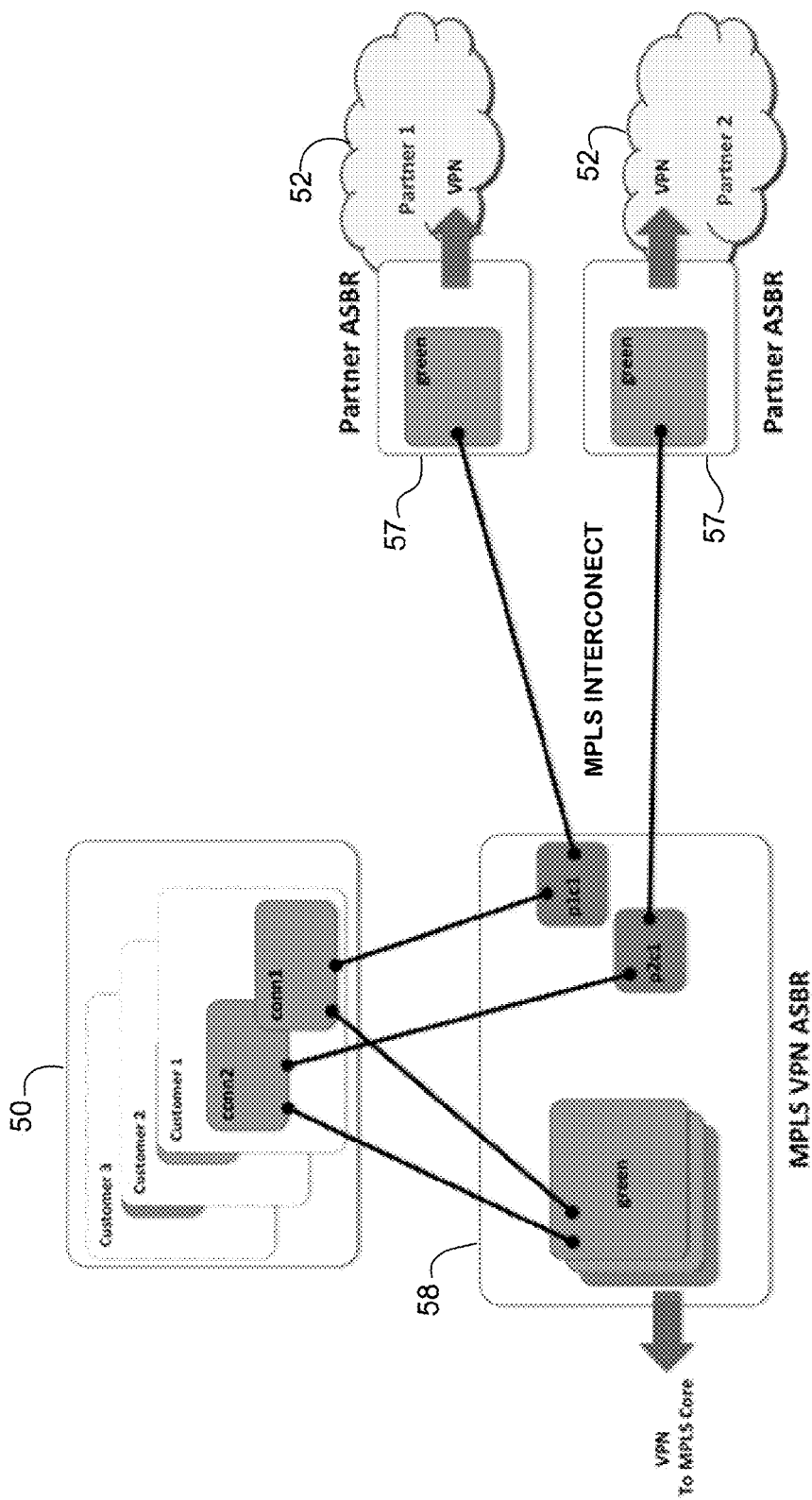
FIG. 4 illustrates an example of data plane connectivity, in accordance with one embodiment.

FIG. 4 illustrates an example of data plane connectivity for an IP Map and Encap-to-MPLS VPN gateway, in accordance with one embodiment. The primary SP uses a gateway device 50 to establish connectivity between the IP Map and Encap system and a native IP MPLS VPN system. In the example shown in FIG. 4, the primary SP is running an MPLS VPN network, and its partner networks also run MPLS VPN networks 52. Rather than using conventional interconnectivity mechanisms, the primary SP deploys an IP Map and Encap service as an overlay to the partner MPLS VPN network 52. In this example, a primary MPLS VPN edge device 58 is located in the MPLS VPN network (e.g., ASBR 18 in network 10 in FIG. 1) and in communication with the gateway device 50 and network devices 57 (e.g., ASBRs 17 in FIG. 1) located at the edge of partner networks 52 (partner 1 and partner 2). The network device 58 is also in communication with an MPLS core.

The gateway device 50 may be operable to handle traffic from any number of customers (e.g., customer 1, customer 2, customer 3), as illustrated in FIG. 4. Customer 1 is represented by a block labeled 'green' in FIG. 4. The customer may be segmented into any number of connections (conn1, conn2 in communication with p1c1 and p2c1, respectively, in FIG. 4).

The gateway 50 provides a number of data plane functions to allow these disparate systems to communicate. The gateway interconnectivity device 50 performs data plane tasks including, for example, encapsulation of traffic from MPLS VPN to IP Map and Encap VPN and decapsulation of traffic from IP Map and Encap VPN to MPLS VPN.

The following describes an example of actions performed for packets flowing from the MPLS VPN system to the IP Map and Encap system. When the native (unencapsulated) packet (which has a destination IP address of a partner CE) arrives at the gateway 50, the gateway encapsulates the packet and sends it towards its destination on the partner network 52. The outer header of this encapsulated packet is an IP packet (which is routable within the partner VPN 52). The inner header of this packet is the original header of the packet from the primary, native MPLS VPN.

The following describes actions performed for packets flowing from the IP Map and Encap system to the MPLS VPN system. Packets sourced from a partner-connected CE are encapsulated and sent to the gateway 50. When the encapsulated packet (which has an outer header destination of the gateway 50) arrives at the gateway, the gateway strips off the outer header, leaving the original, native packet, which the gateway forwards (natively) to the appropriate MPLS VPN VRF (Virtual Routing and Forwarding).

The above described behavior preserves the segmentation between customer traffic by providing a 1:1 mapping between partner VRFs and native MPLS-VPN VRFs.

Reducing Number of VRFs

One or more embodiments enable an SP to run an IP Map and Encap system as an overlay to an MPLS VPN network to allow customers to run multiple VRFs for internal, departmental segmentation, but only need the SP to run a single customer VRF with the core MPLS VPN network.

Enabling an SP to run an IP Map and Encap system as an overlay to an MPLS VPN network to allow customers to run multiple VRFs for internal, departmental segmentation, reduces the number of customer VRFs needed within the core MPLS VPN network to a single MPLS VRF per customer. This significantly improves scaling limitations within the core MPLS VPN network, thereby allowing the SP to more efficiently operate the network.

In one embodiment, virtualization is enabled within customer address space in the IP Map and Encap system. By virtualizing the customer address space in this way, an SP running an IP Map and Encap system as an overlay to an MPLS VPN only needs to run a single VRF for each customer VPN, thus minimizing the total number of VRFs needed with the MPLS network.

In one example, an SP runs the MPLS VPN network 10 and an IP Map and Encap system as an overlay to another MPLS VPN network 12 (FIG. 1). The SP may, for example, deploy mapping server 22 that maintains customer prefix segmentation within the IP Map and Encap control plane 24. The SP may also deploy a single VRF per VPN customer within the MPLS VPN network serving as locator space segmentation for the 'encap' side of the IP Map and Encap data plane. The map server 22 provides control plane segmentation, which permits overlapping IP addresses within customer VPNs. The IP Map and Encap data plane devices utilize the control plane information within packet headers built during the encapsulation process to segment traffic across the single customer VRF within the SP MPLS VPN network 10.

Parallel Segmentation and VPNs

One or more embodiments enable parallel IP Map and Encap system locator space virtualization. Parallel segmentation allows for a single map server and gateway to be shared to interconnect multiple partners. Enabling gateway device and mapping service device parallel segmentation confine partner network infrastructure addressing to isolated containers, thereby allowing one device to be shared to support multiple partner network interconnections.

In one example, the primary SP runs MPLS VPN network 10 and its partner network also runs an MPLS VPN network 12. The primary SP deploys and operates a gateway device 50 that utilizes parallel network segmentation to connect into the customer MPLS VPN locator space within one or more partner MPLS VPNs (FIGS. 1 and 4). The primary SP may also deploy an IP Map and Encap service on customer CE devices 20 running in the partner MPLS VPN network 12. In another example, the primary SP may deploy a mapping service device 22 that utilizes parallel network segmentation to allow registration of customer CE devices running the IP Map and Encap service within one or more partner MPLS VPNs The gateway device parallel segmentation allows the primary SP to restrict partner infrastructure addresses from leaving into its own customer MPLS VPN routing table and yet still provides data plane services across multiple partner SP MPLS VPN networks with no change of architecture, configuration, or operation, regardless of partner SP MPLS VPN capabilities. The mapping service device parallel segmentation allows the primary SP to provide control plane services across multiple partner SP MPLS VPN networks to support these data plane services.

Consistent Data Plane Services with Encapsulation

One or more embodiments enable consistent IP data plane services across diverse VPN environments while also allowing for optimal routing via the IP Map and Encap system. In today's telecommunications environment, it is not uncommon for an enterprise customer to contract with a primary service provider for global VPN services. Yet, many of these primary SPs do not have a global network footprint and thus require partner arrangements with local secondary SPs. When these two VPN domains interconnect, it is not uncommon that there is a service inconsistency (i.e., mismatched QoS, multicast capabilities or IPv4/IPv6 services). If a CPE (customer provider edge) device is enabled with an IP Map and Encap system, which provides stateless tunnels that traverse the secondary SP's basic IP VPN service and there is an appropriate gateway device between the SP domains, then service parity with the primary SP can be maintained while only needing the most basic IP VPN transport from the secondary SP.

In conventional networks, when two SPs interconnect, there usually is a mismatch in data plane service models, which results in the inability to provide that service to the end customer. In one example, a primary SP runs an MPLS VPN service that provides private IP transport for IPv4 services for a contracted enterprise customer, but optionally the customer can purchase advanced services such as IPv6 transport, multicast services, or QoS services from this primary SP's MPLS VPN. All these additional services have specific configuration options and characteristics that are set by the primary SP and are part of the end-to-end contracted service definition that the enterprise customer purchased.

The primary SP has invested capital and operation expenditures in supporting these advanced services and has enabled its network footprint to support these capabilities. However, if the primary SP contracts with a secondary MPLS VPN service provider in order to extend the network reach to a specific set of customer sites that are not within the primary SPs covered geography, it is highly likely that these optional data plane services will be mismatched and configured differently by the secondary SP or unavailable altogether. This means different end-to-end network characteristics from the expected primary SPs service definition.

For example, for QoS services the primary SP expects arriving IP packets to be already classified a certain way via the DSCP (Differentiated Services Code Point) bits in the IP header so that it can provide proper QoS treatment as configured in the network. This classification (or marking) is defined by the primary SP and it is expected that the end customer adheres to this published definition. However, the secondary SP, which hosts the customer site connection, may have defined a different QoS DSCP classification model. Similar inconsistencies can exist for IPv6 and multicast services. Thus, when two SPs interconnect, there usually is a mismatch in service models which would result in the inability to provide that service to the end customer as expected. For example, if the primary SP supports multicast and the secondary SP does not, then there is no end-to-end multicast. Also, if the primary SP supports IPv6 and the secondary SP does not, then there is no end-to-end IPv6 transport. If the primary SP supports QoS with "X" classes of service and the secondary SP only supports a limited set of "X-3" classes of service, then there is only the limited "X-3" classes of service end-to-end.

The embodiments described herein enable a primary SP to run an IP Map and Encap system as an overlay to a secondary SPs MPLS VPN network, which allows enhanced services consistency between customer sites while providing optimal any-to-any routing and enhanced security. By only needing the secondary SP to support a basic IPv4 MPLS VPN service, the primary SP can use the IP Map and Encap system to provide enhanced services data plane feature consistency. The primary SP may deploy a CPE at the customer site (which has configuration policies specified by the primary SP) that is performing the IP Map and Encap function. The stateless IP tunnels 26 enabled by this system carry within it the original customer data plane traffic where this traffic supports all the optional services as defined by the primary SP (FIG. 1). Additionally, due to the nature of the IP Map and Encap system providing any-to-any optimal routing via a scalable mapping server model, these optional advanced services can also be extended in a very scalable way between two different sites on the same secondary SPs network (i.e., traffic does not traverse the primary SP network).

The IP Map and Encap system uses map server 22 to provide the control plane 24 with the mapping that allows the IP Map and Encap service to IPv4 encapsulate customer traffic between locations, where the IPv4 location identifiers may be the only routes carried in the secondary SP's MPLS VPN network (FIG. 1). Stateless IP tunnels 26 are enabled by this system that carries within it the original customer data plane traffic packets, where this traffic supports all of the optional services as defined by the primary SP.

For example, if the customer needs IPv6 or multicast services (or any non-basic IPv4 unicast service), these types of packets are encapsulated by the CPE in unicast IPv4 and tunneled over the secondary SPs basic IPv4 network to the primary SP's IP map and encap gateway device 50, which would terminate the IPv4 tunnel and put the customer's native traffic into the primary SP's MPLS VPN network 10, which is enabled for native IPv6 or multicast VPN services (FIGS. 1 and 4). Additionally, due to the nature of the map and encap system providing any-to-any optimal routing via a scalable mapping server model, these optional advanced services can also be extended in a very scalable way between two different sites on the same secondary SPs network (i.e., traffic does not have to traverses the primary SP's network). This is considered an advantage over traditional static based tunneling models.

For QoS services, the customer data plane traffic may be DSCP classified at the CPE using the primary service provider's policies, and then encapsulated by the CPE's IP Map and Encap system into an IPv4 unicast tunnel and sent over the secondary SPs network. When the packet arrives at the primary SP's IP Map and Encap gateway device 50, the tunnel encapsulation is terminated and the customer data plane packet is exposed (which has the proper primary SP DSCP markings), and is then provided the same QoS functionality as other traffic native to the MPLS VPN network.

Lastly, by allowing the data plane encapsulation protocol to support a virtualization identification field (set by the primary SP's policy definition on the CPE and not by the secondary SP), the primary service provider can ensure proper VPN bindings between the two service provider domains, thereby enhancing the overall security of the solution.

Interconnecting IP Map and Encap System with VPN Via Mapping System

One or more embodiments enable control plane connectivity between customer sites operating within a traditional MPLS VPN and sites of the same customer that operate as an IP Map and Encap overlay VPN (which is also traversing another MPLS network) within one or more partner MPLS networks.

In one embodiment, a device, referred to herein as a mapping system server, is responsible for marrying the contents of the MPLS VPN's BGP control plane with the IP Map and Encap system's control plane. The mapping system server cross publishes the two system's information to ensure bi-directional data plane reachability. The mapping system server device provides for the interconnection of routing system information to enable data plane reachability between any of the systems.

Enabling control plane interconnectivity via an IP Map and Encap architecture allows an SP not only to simplify partner interoperability relationships, but also establish a foundation for enabling other enhancements and services that are available within an IP Map and Encap system, but not available with traditional interconnectivity mechanisms.

Figure 5:
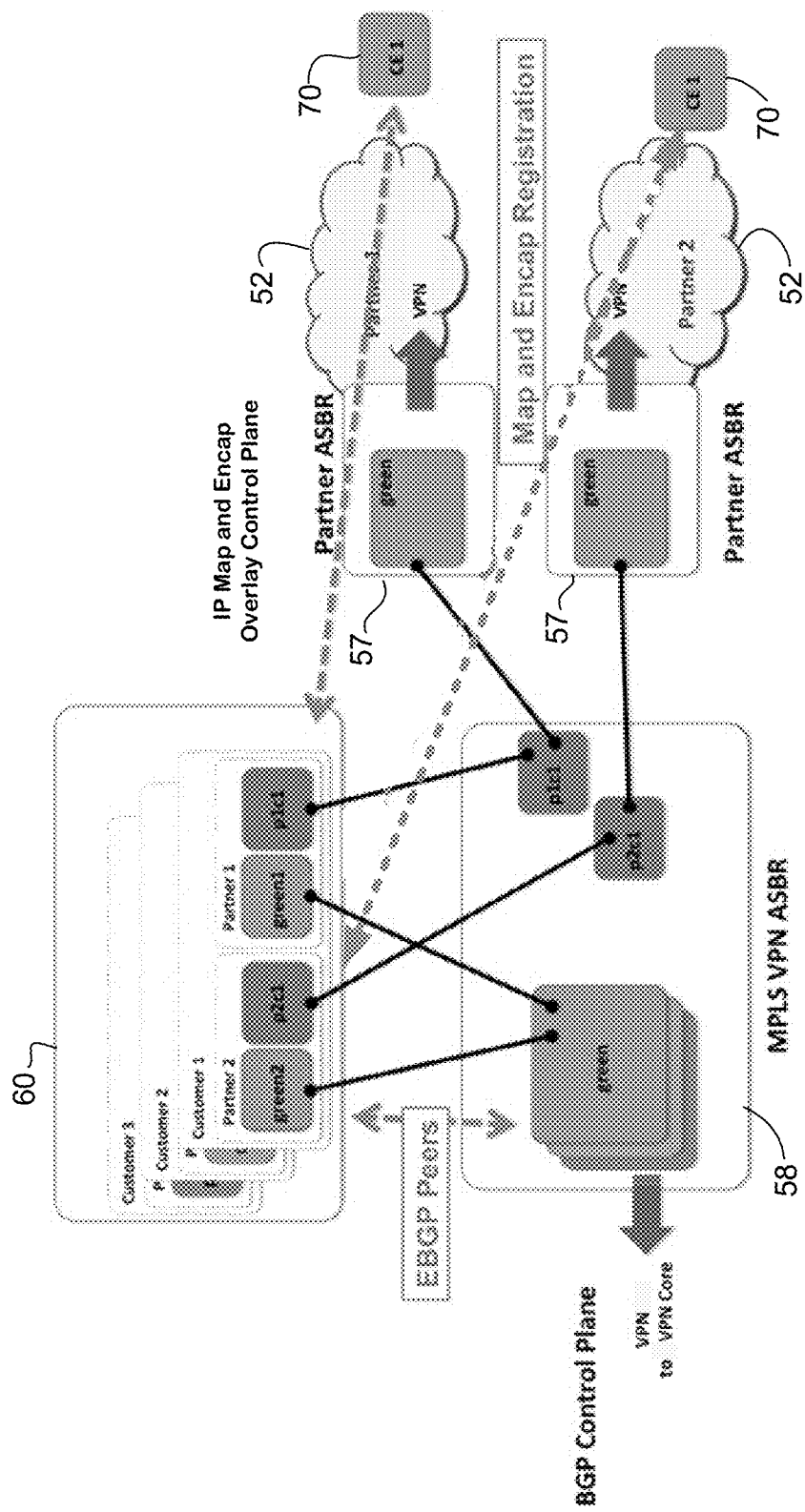
FIG. 5 illustrates an example of control plane connectivity, in accordance with one embodiment.

FIG. 5 illustrates an example of control plane connectivity for an IP Map and Encap-to-MPLS VPN gateway. As described above, the IP Map and Encap overlay control plane extends from the mapping system to CE devices 70. FIG. 5 shows how the primary SP uses a mapping system server (MSS) 60 to establish reachability for both BGP information from the traditional MPLS VPN network, and the IP Map and Encap information from the overlay network, in accordance with one embodiment. As shown in FIG. 5, the edge device 58 (in the primary network 10 of FIG. 1) and the MSS 60 are EBPG (External Border Gateway Protocol) peers. Map and Encap registration is performed over the control plane.

The MSS 60 provides, but is not limited to, the following example control plane functions to allow the disparate systems to communicate. The MSS 60 may import BGP routes describing the reachability of MPLS VPN sites into an MSS database. Also, the device may export from the MSS database the IP Map and Encap site prefixes into the MPLS VPN's BGP control plane.

The above described behavior preserves control plane consistency across all networks, ensuring paths and reachability for the data plane packets.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving at a first network device in a first virtual private network, a packet destined for a second network device in communication with a second virtual private network, said first network device in communication with a map and encapsulate system; and
   transmitting the packet over said second network, wherein the packet is encapsulated for transmittal on a tunnel extending from said first network device to said second network device based on a mapping received from the map and encapsulate system;
   wherein the map and encapsulate system provides said mapping used to encapsulate the packet to one or more provider edge devices in said first virtual private network to provide an overlay that traverses over said second virtual private network and wherein services provided by said first virtual private network are tunneled over said second virtual private network to said second network device.

2. The method of claim 1 wherein each of said virtual private networks comprise an MPLS (Multiprotocol Label Switching) network.

3. The method of claim 1 wherein each of said virtual private networks is associated with a different service provider.

4. The method of claim 1 further comprising mapping the packet to the tunnel and encapsulating the packet with an IP header for transport on the tunnel.

5. The method of claim 4 wherein said mapping and said encapsulating are performed at a gateway device in communication with said first network device and operable to perform data plane tasks for the system.

6. The method of claim 1 wherein said first network device comprises a provider edge device and said second network device comprises a customer edge device, each of the edge devices operating as a tunnel endpoint.

7. The method of claim 1 further comprising maintaining customer prefix segmentation with a mapping server of the system.

8. The method of claim 1 wherein a single virtual routing and forwarding (VRF) is provided for each virtual private network customer within said virtual private networks.

9. The method of claim 1 wherein said first virtual private network is in communication with a third virtual private network and wherein a gateway device in communication with said first network device utilizes parallel network segmentation to provide communication between said first virtual private network and said other virtual private networks.

10. The method of claim 1 further comprising transmitting traffic over the tunnel, wherein the traffic supports services provided by said first virtual private network and not configured on said second virtual private network.

11. An apparatus comprising:
a processor for processing a packet received in a first virtual private network and destined for a second network device in communication with a second virtual private network, and transmitting the packet over said second network, wherein the packet is encapsulated for transmittal on a tunnel extending from the apparatus to said second network device;
wherein the apparatus is in communication with a system operable to map and encapsulate the packet and provide an overlay that traverses over said second virtual private network, the system operable to provide a mapping used to encapsulate the packet to one or more provider edge devices in said first virtual private network, and
wherein services provided by said first virtual private network are tunneled over said second virtual private network to said second network device.

12. The apparatus of claim 11 wherein each of said virtual private networks comprise an MPLS (Multiprotocol Label Switching) network.

13. The apparatus of claim 11 wherein each of said virtual private networks is associated with a different service provider.

14. The apparatus of claim 11 wherein the apparatus is further operable to map the packet to the tunnel and encapsulate the packet with an IP header for transport on the tunnel.

15. The apparatus of claim 14 wherein said mapping and said encapsulating are performed at a gateway device in communication with the apparatus and operable to perform data plane tasks for the system.

16. The apparatus of claim 11 wherein the apparatus is configured to operate as a provider edge device and said second network device comprises a customer edge device, each of the edge devices configured to operate as a tunnel endpoint.

17. The apparatus of claim 11 wherein the system comprises a mapping database for storing customer prefix segmentation.

18. The apparatus of claim 11 wherein a single virtual routing and forwarding (VRF) is provided for each virtual private network customer within said virtual private networks.

19. The apparatus of claim 11 wherein the apparatus is configured for communication with a third virtual private network and wherein a gateway device in communication with the apparatus utilizes parallel network segmentation to provide communication between said first virtual private network and other virtual private networks.

20. A system comprising:
a processor for processing a packet received at a data plane device in communication with a first virtual private network, the packet destined for a network device in communication with a second virtual private network, mapping and encapsulating the packet for transmittal on an overlay that traverses over said second virtual private network; and
a mapping database for maintaining control plane information for use in mapping and encapsulating the packet;
wherein services provided by said first virtual private network are tunneled over said second virtual private network.

* * * * *